United States Patent
Sodagar

(10) Patent No.: US 11,632,414 B2
(45) Date of Patent: Apr. 18, 2023

(54) METRICS FOR MEASURING AND MONITORING UPLINK STREAMING

(71) Applicant: TENCENT AMERICA LLC, Palo Alto, CA (US)

(72) Inventor: Iraj Sodagar, Los Angeles, CA (US)

(73) Assignee: TENCENT AMERICA LLC, Palo Alto, CA (US)

(*) Notice: Subject to any disclaimer, the term of this patent is extended or adjusted under 35 U.S.C. 154(b) by 0 days.

(21) Appl. No.: 17/885,031

(22) Filed: Aug. 10, 2022

(65) Prior Publication Data

US 2023/0068218 A1 Mar. 2, 2023

Related U.S. Application Data

(60) Provisional application No. 63/232,018, filed on Aug. 11, 2021.

(51) Int. Cl.
*H04L 65/80* (2022.01)
*H04L 65/1063* (2022.01)

(52) U.S. Cl.
CPC .......... *H04L 65/80* (2013.01); *H04L 65/1063* (2013.01)

(58) Field of Classification Search
CPC .............................. H04L 65/80; H04L 65/1063
See application file for complete search history.

(56) References Cited

U.S. PATENT DOCUMENTS

| 11,184,917 B2 * | 11/2021 | Zacharias ............. H04W 72/21 |
| 2013/0272159 A1 | 10/2013 | Pang et al. |
| 2018/0139773 A1 | 5/2018 | Ma et al. |
| 2019/0334794 A1 | 10/2019 | Halepovic et al. |

(Continued)

FOREIGN PATENT DOCUMENTS

| TW | 202209909 A * | 3/2022 | |
| WO | WO-2020005610 A1 * | 1/2020 | ......... H04N 21/2183 |
| WO | WO-2022036491 A1 * | 2/2022 | |

OTHER PUBLICATIONS

ETSI TS 126 501 V16.7.0, May 31, 2021 (May 31, 2021) [retrieved on Nov. 14, 2022], Retrieved from the internet <URL https://www.etsi.Org/deliver/etsiJs/126500_126599/126501/16.07.00_60/ts_126501v160700p.pdf> entire document (48 pages).

(Continued)

*Primary Examiner* — Oanh Duong
(74) *Attorney, Agent, or Firm* — Sughrue Mion, PLLC

(57) ABSTRACT

Systems, devices, and methods for user equipment monitoring during a 5G Media Streaming (5GMS) uplink streaming session are provided which may include determining an average throughput object for a predetermined interval, wherein the average throughput object comprises a number of bytes of media content uploaded throughout the predetermined interval, and generating an activity list report associated with the 5GMS uplink streaming session, wherein the activity list report comprises a list of uplink periods during which content is uplink streamed. The approach may further include determining media information object associated with the media content uploaded during the 5GMS uplink streaming session, and transmitting the average throughput object, the activity list report, and the media information object to a 5GMS application function.

20 Claims, 5 Drawing Sheets

(56) References Cited

U.S. PATENT DOCUMENTS

2019/0394498 A1* 12/2019 Lo ..................... H04N 21/2407
2021/0136424 A1*  5/2021 Lo ..................... H04N 21/239

OTHER PUBLICATIONS

International Search Report dated Dec. 5, 2022, issued in International Application No. PCT/US2022/040025.
Written Opinion dated Dec. 5, 2022, issued in International Application No. PCT/US2022/040025.
3GPP TS 26.247 V16.4.1, 3rd Generation Partnership Project; Technical Specification Group Services and System Aspects; Transparent end-to-end Packet-switched Streaming Service (PSS); Progressive Download and Dynamic Adaptive Streaming over HTTP (3GP-DASH) (Release 16), Oct. 2020, pp. 1-140.
3GPP TS 26.501V16.8.0, 3rd Generation Partnership Project; Technical Specification Group Services and System Aspects; 5G Media Streaming (5GMS); General description and architecture (Release 16), Jun. 2021, pp. 1-79.
3GPP TS 26.512 V16.3.0, 3rd Generation Partnership Project; Technical Specification Group Services and System Aspects; 5G Media Streaming (5GMS); Protocols (Release 16), Jun. 2021, pp. 1-138.
Thomas Stockhammer, "Editor's Version of DASH IS 4th Edition", International Organisation For Standardisation Organisation Internationale De Normalisation ISO/ IEC JTC1/SC29/WG11 Coding Of Moving Pictures And Audio Qualcomm Incorporated, Jan. 2020, Brussels, BE, pp. 1-287.

* cited by examiner

METRICS FOR MEASURING AND MONITORING UPLINK STREAMING

CROSS-REFERENCE TO RELATED APPLICATION(S)

This application claims priority from U.S. Provisional Application No. 63/232,018, filed on Aug. 11, 2021, in the United States Patent and Trademark Office, the disclosure of which is incorporated herein by reference in its entirety.

FIELD

Embodiments of this disclosure are directed to media processing and streaming methods and systems, more particularly to defining metrics for measuring and monitoring uplink streaming sessions.

BACKGROUND

The 5G media streaming architecture defined in 3GPP TS26.501 (3rd Generation Partnership Project; Technical Specification Group Services and System Aspects; 5G Media Streaming (5GMS)) only defines the general architecture for uplink and downlink media streaming. While 3GPP TS26.501 and 3GPP TS26.512 define the general uplink process, they do not define metrics for upload streaming. Furthermore, the DASH-IF Ingest protocol also does not define any metric for uplink streaming.

Several metrics may be used for measuring and monitoring the internet streaming session where a device is downlink streaming media content over the network (internet, wireless, 5G, or any other network). Specifications such as MPEG-DASH and 3GPP TS26.247 define various metrics for download streaming. However, the metrics for uplink streaming, where the content is streamed from the device to the network are not defined.

Therefore, definitions of uplink metrics, i.e. specific parameters that may be measured and monitored by the uplink streaming client may be needed and may be provided to a service provider to either dynamically improve the delivery network or for further analysis of the overall delivery system.

SUMMARY

According to one or more embodiments, a method for user equipment monitoring during a 5G Media Streaming (5GMS) uplink streaming session may be provided. The method may be performed by at least one processor and may include determining an average throughput object for a predetermined interval, wherein the average throughput object comprises a number of bytes uploaded throughout the predetermined interval; generating an activity list report associated with the uplink streaming session, wherein the activity list report comprises a list of uplink periods during which content is uplink streamed; determining media information object associated with media content uploaded during the uplink streaming session; and transmitting the average throughput object, the activity list report, and the media information object to a 5GMS application function.

According to one or more embodiments, a device for user equipment monitoring during a 5G Media Streaming (5GMS) uplink streaming session may be provided. The device may include at least one memory configured to store program code; and at least one processor configured to read the program code and operate as instructed by the program code. The program code may include first determining code configured to cause the at least one processor to determine an average throughput object for a predetermined interval, wherein the average throughput object comprises a number of bytes uploaded throughout the predetermined interval; first generating code configured to cause the at least one processor to generate an activity list report associated with the uplink streaming session, wherein the activity list report comprises a list of uplink periods during which content is uplink streamed; second determining code configured to cause the at least one processor to determine media information object associated with media content uploaded during the uplink streaming session; and first transmitting configured to cause the at least one processor to transmit the average throughput object, the activity list report, and the media information object to a 5GMS application function.

According to one or more embodiments, a non-transitory computer-readable medium stores instructions may be provided. The instructions may include one or more instructions that, when executed by one or more processors of a device for 5G media streaming (5GMS) uplink streaming session, cause the one or more processors to determine an average throughput object for a predetermined interval, wherein the average throughput object comprises a number of bytes uploaded throughout the predetermined interval; generate an activity list report associated with the uplink streaming session, wherein the activity list report comprises a list of uplink periods during which content is uplink streamed; determine media information object associated with media content uploaded during the uplink streaming session; and transmit the average throughput object, the activity list report, and the media information object to a 5GMS application function.

BRIEF DESCRIPTION OF THE DRAWINGS

Further features, the nature, and various advantages of the disclosed subject matter will be more apparent from the following detailed description and the accompanying drawings in which.

DETAILED DESCRIPTION

Figure 1:
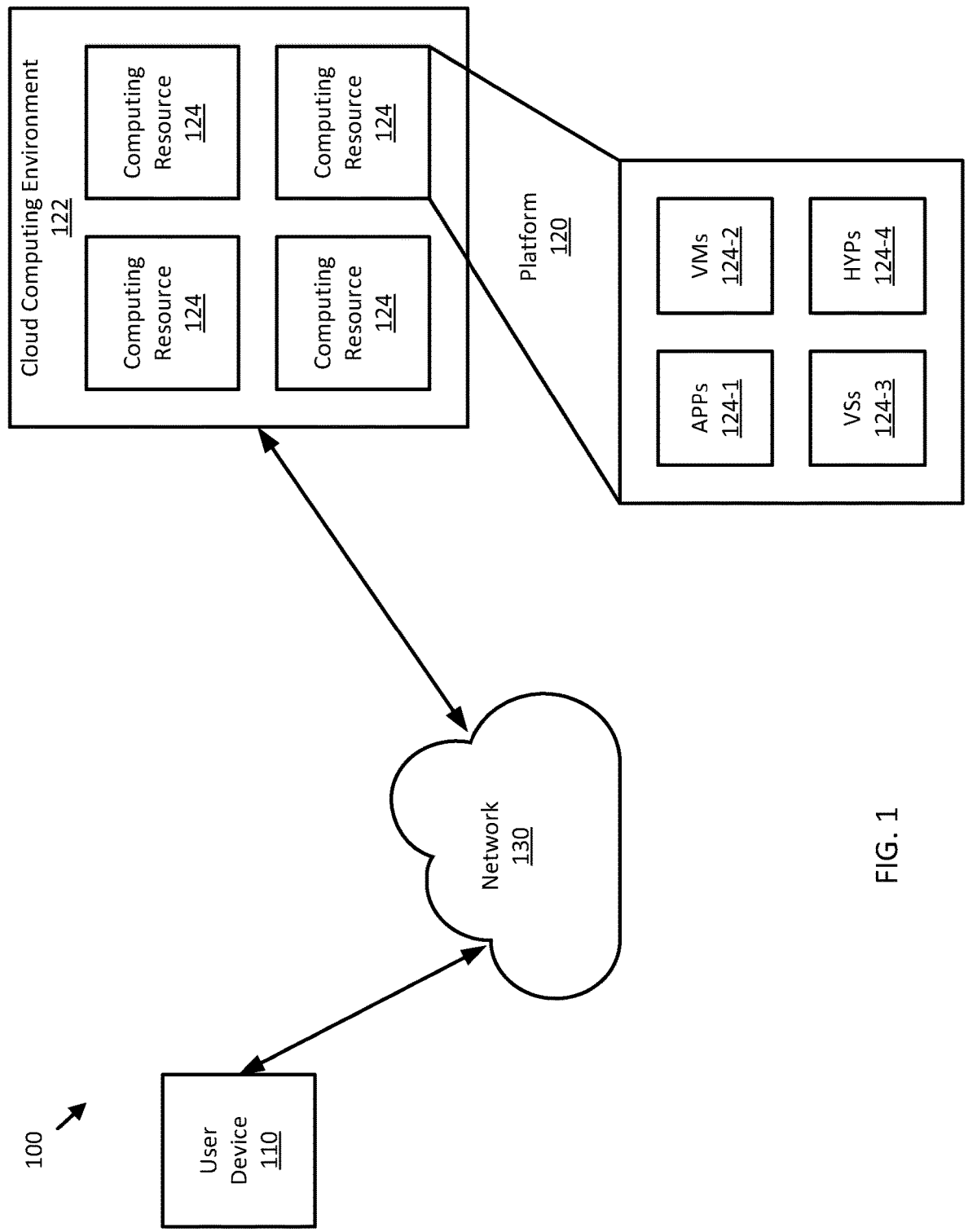
FIG. 1 is a diagram of an environment in which methods, apparatuses, and systems described herein may be implemented, according to embodiments.

FIG. 1 is a diagram of an environment 100 in which methods, apparatuses, and systems described herein may be implemented, according to embodiments. As shown in FIG. 1, the environment 100 may include a user device 110, a platform 120, and a network 130. Devices of the environment 100 may interconnect via wired connections, wireless connections, or a combination of wired and wireless connections.

The user device 110 includes one or more devices capable of receiving, generating, storing, processing, and/or providing information associated with platform 120. For example, the user device 110 may include a computing device (e.g., a desktop computer, a laptop computer, a tablet computer, a handheld computer, a smart speaker, a server, etc.), a mobile phone (e.g., a smart phone, a radiotelephone, etc.), a wearable device (e.g., a pair of smart glasses or a smart watch), or a similar device. In some implementations, the user device 110 may receive information from and/or transmit information to the platform 120.

The platform 120 includes one or more devices as described elsewhere herein. In some implementations, the platform 120 may include a cloud server or a group of cloud servers. In some implementations, the platform 120 may be designed to be modular such that software components may be swapped in or out depending on a particular need. As such, the platform 120 may be easily and/or quickly reconfigured for different uses.

In some implementations, as shown, the platform 120 may be hosted in a cloud computing environment 122. Notably, while implementations described herein describe the platform 120 as being hosted in the cloud computing environment 122, in some implementations, the platform 120 may not be cloud-based (i.e., may be implemented outside of a cloud computing environment) or may be partially cloud-based.

The cloud computing environment 122 includes an environment that hosts the platform 120. The cloud computing environment 122 may provide computation, software, data access, storage, etc. services that do not require end-user (e.g. the user device 110) knowledge of a physical location and configuration of system(s) and/or device(s) that hosts the platform 120. As shown, the cloud computing environment 122 may include a group of computing resources 124 (referred to collectively as "computing resources 124" and individually as "computing resource 124").

The computing resource 124 includes one or more personal computers, workstation computers, server devices, or other types of computation and/or communication devices. In some implementations, the computing resource 124 may host the platform 120. The cloud resources may include compute instances executing in the computing resource 124, storage devices provided in the computing resource 124, data transfer devices provided by the computing resource 124, etc. In some implementations, the computing resource 124 may communicate with other computing resources 124 via wired connections, wireless connections, or a combination of wired and wireless connections.

As further shown in FIG. 1, the computing resource 124 includes a group of cloud resources, such as one or more applications ("APPs") 124-1, one or more virtual machines ("VMs") 124-2, virtualized storage ("VSs") 124-3, one or more hypervisors ("HYPs") 124-4, or the like.

The application 124-1 includes one or more software applications that may be provided to or accessed by the user device 110 and/or the platform 120. The application 124-1 may eliminate a need to install and execute the software applications on the user device 110. For example, the application 124-1 may include software associated with the platform 120 and/or any other software capable of being provided via the cloud computing environment 122. In some implementations, one application 124-1 may send/receive information to/from one or more other applications 124-1, via the virtual machine 124-2.

The virtual machine 124-2 includes a software implementation of a machine (e.g. a computer) that executes programs like a physical machine. The virtual machine 124-2 may be either a system virtual machine or a process virtual machine, depending upon use and degree of correspondence to any real machine by the virtual machine 124-2. A system virtual machine may provide a complete system platform that supports execution of a complete operating system ("OS"). A process virtual machine may execute a single program, and may support a single process. In some implementations, the virtual machine 124-2 may execute on behalf of a user (e.g. the user device 110), and may manage infrastructure of the cloud computing environment 122, such as data management, synchronization, or long-duration data transfers.

The virtualized storage 124-3 includes one or more storage systems and/or one or more devices that use virtualization techniques within the storage systems or devices of the computing resource 124. In some implementations, within the context of a storage system, types of virtualizations may include block virtualization and file virtualization. Block virtualization may refer to abstraction (or separation) of logical storage from physical storage so that the storage system may be accessed without regard to physical storage or heterogeneous structure. The separation may permit administrators of the storage system flexibility in how the administrators manage storage for end users. File virtualization may eliminate dependencies between data accessed at a file level and a location where files are physically stored. This may enable optimization of storage use, server consolidation, and/or performance of non-disruptive file migrations.

The hypervisor 124-4 may provide hardware virtualization techniques that allow multiple operating systems (e.g. "guest operating systems") to execute concurrently on a host computer, such as the computing resource 124. The hypervisor 124-4 may present a virtual operating platform to the guest operating systems, and may manage the execution of the guest operating systems. Multiple instances of a variety of operating systems may share virtualized hardware resources.

The network 130 includes one or more wired and/or wireless networks. For example, the network 130 may include a cellular network (e.g. a fifth generation (5G) network, a long-term evolution (LTE) network, a third generation (3G) network, a code division multiple access (CDMA) network, etc.), a public land mobile network (PLMN), a local area network (LAN), a wide area network (WAN), a metropolitan area network (MAN), a telephone network (e.g. the Public Switched Telephone Network (PSTN)), a private network, an ad hoc network, an intranet, the Internet, a fiber optic-based network, or the like, and/or a combination of these or other types of networks.

The number and arrangement of devices and networks shown in FIG. 1 are provided as an example. In practice, there may be additional devices and/or networks, fewer devices and/or networks, different devices and/or networks, or differently arranged devices and/or networks than those shown in FIG. 1. Furthermore, two or more devices shown in FIG. 1 may be implemented within a single device, or a single device shown in FIG. 1 may be implemented as multiple, distributed devices. Additionally, or alternatively, a set of devices (e.g. one or more devices) of the environment 100 may perform one or more functions described as being performed by another set of devices of the environment 100.

Figure 2:
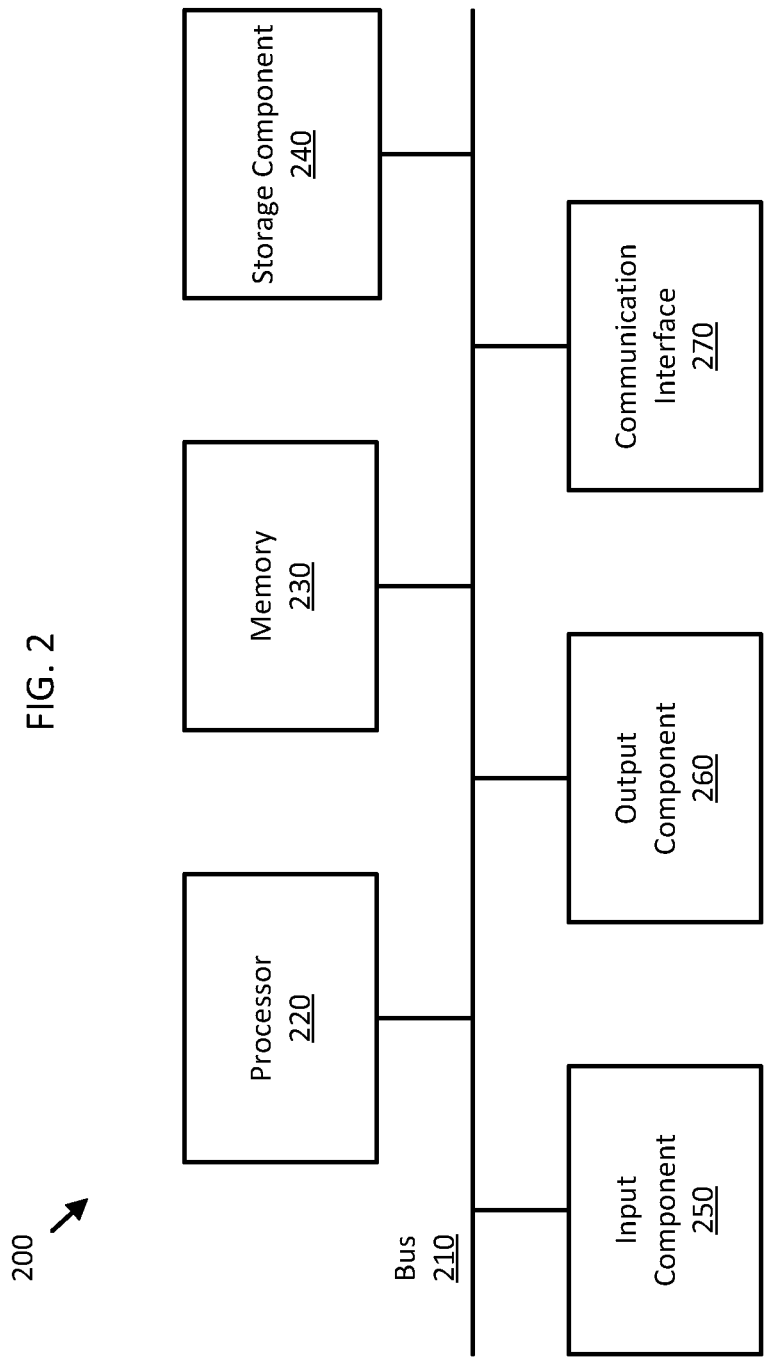
FIG. 2 is a block diagram of example components of one or more devices of FIG. 1.

FIG. 2 is a block diagram of example components of one or more devices of FIG. 1. The device 200 may correspond to the user device 110 and/or the platform 120. As shown in FIG. 2, the device 200 may include a bus 210, a processor 220, a memory 230, a storage component 240, an input component 250, an output component 260, and a communication interface 270.

The bus 210 includes a component that permits communication among the components of the device 200. The processor 220 is implemented in hardware, firmware, or a combination of hardware and software. The processor 220 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, the processor 220 includes one or more processors capable of being programmed to perform a function. The memory 230 includes a random access memory (RAM), a read only memory (ROM), and/or another type of dynamic or static storage device (e.g. a flash memory, a magnetic memory, and/or an optical memory) that stores information and/or instructions for use by the processor 220.

The storage component 240 stores information and/or software related to the operation and use of the device 200. For example, the storage component 240 may include a hard disk (e.g. a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

The input component 250 includes a component that permits the device 200 to receive information, such as via user input (e.g. a touch screen display, a keyboard, a keypad, a mouse, a button, a switch, and/or a microphone). Additionally, or alternatively, the input component 250 may include a sensor for sensing information (e.g. a global positioning system (GPS) component, an accelerometer, a gyroscope, and/or an actuator). The output component 260 includes a component that provides output information from the device 200 (e.g. a display, a speaker, and/or one or more light-emitting diodes (LEDs)).

The communication interface 270 includes a transceiver-like component (e.g., a transceiver and/or a separate receiver and transmitter) that enables the device 200 to communicate with other devices, such as via a wired connection, a wireless connection, or a combination of wired and wireless connections. The communication interface 270 may permit the device 200 to receive information from another device and/or provide information to another device. For example, the communication interface 270 may include an Ethernet interface, an optical interface, a coaxial interface, an infrared interface, a radio frequency (RF) interface, a universal serial bus (USB) interface, a Wi-Fi interface, a cellular network interface, or the like.

The device 200 may perform one or more processes described herein. The device 200 may perform these processes in response to the processor 220 executing software instructions stored by a non-transitory computer-readable medium, such as the memory 230 and/or the storage component 240. A computer-readable medium is defined herein as a non-transitory memory device. A memory device includes memory space within a single physical storage device or memory space spread across multiple physical storage devices.

Software instructions may be read into the memory 230 and/or the storage component 240 from another computer-readable medium or from another device via the communication interface 270. When executed, software instructions stored in the memory 230 and/or the storage component 240 may cause the processor 220 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 2 are provided as an example. In practice, the device 200 may include additional components, fewer components, different components, or differently arranged components than those shown in FIG. 2. Additionally, or alternatively, a set of components (e.g. one or more components) of the device 200 may perform one or more functions described as being performed by another set of components of the device 200.

A 5G media streaming (5GMS) system may be an assembly of AFs, application servers, and interfaces from the 5G media streaming architecture that support either downlink media streaming services or uplink media streaming services, or both. A 5GMS Application Provider may include a party that interacts with functions of the 5GMS system and supplies a 5GMS Aware Application that interacts with functions of the 5GMS system. The 5GMS Aware Application may refer to an application in the user equipment (UE), provided by the 5GMS Application Provider, that contains the service logic of the 5GMS application service, and interacts with other 5GMS Client and Network functions via the interfaces and application programming interfaces (APIs) defined in the 5GMS architecture. A 5GMS Client may refer to a UE function that is either a 5GMS downlink (5GMSd) Client or a 5GMS uplink (5GMSu) Client, or both.

The 5GMSd Client may refer to a UE function that includes at least a 5G media streaming player and a media session handler for downlink streaming and that may be accessed through well-defined interfaces/APIs. The 5GMSu Client may refer to an originator of a 5GMSu service that may be accessed through well-defined interfaces/APIs. A 5GMSu media streamer may refer to a UE function that enables uplink delivery of streaming media content to an Application Server (AS) function of the 5GMS Application Provider, and which interacts with both the 5GMSu Aware Application for media capture and subsequent streaming, and the Media Session Handler for media session control.

A dynamic policy may refer to a dynamic policy and charging control (PCC) rule for an uplink or downlink application flow during a media session. An egest session may refer to an uplink media streaming session from the 5GMS AS towards the 5GMSu Application Provider. An ingest session may refer to a session to upload the media content to a 5GMSd AS. A policy template may refer to a collection of (semi-static) Policy or Control Function (PCF)/Network Exposure Function (NEF) API parameters which are specific to the 5GMS Application Provider and also the resulting PCC rule. A policy template ID may identify the desired policy template, which is used by the 5GMSd Application Function (AF) to select the appropriate PCF/NEF API towards the 5G system so that the PCF can compile the desired PCC rule. The Media Player Entry may refer to a document or a pointer to a document that defines a media presentation (e.g., a media presentation description (MPD) for DASH or a uniform resource locator (URL) to a video clip file). A Media Streamer Entry may refer to a pointer (e.g., in the form of a URL) that defines an entry point of an uplink media streaming session. A presentation entry may refer to a document or a pointer to a document that defines an application presentation, such as an HTML5 document.

A Provisioning Session may refer to a data structure supplied at an interface (M1d) by a 5GMSd Application provider that configures the 5GMSd features relevant to a set of 5GMSd Aware Applications. A 5GMSd Media Player may refer to a UE function that enables playback and rendering of a media presentation based on a media play entry and exposing some basic controls such as play, pause, seek, stop, to the 5GMSd Aware Application. Server Access Information may refer to a set of parameters and addresses (including 5GMSd AF and 5GMSd AS addresses) which are needed to activate the reception of a streaming session. A Service and Content Discovery may refer to functionality and procedures provided by a 5GMSd Application Provider to a 5GMS Aware Application that enables the end user to discover the available streaming service and content offerings and select a specific service or content item for access. A Service Announcement may refer to procedures conducted between the 5GMS Aware Application and the 5GMS Application Provider such that the 5GMS Aware Application is able to obtain 5GMS Service Access Information, either directly or in the form of a reference to that information.

A third party player may refer to a part of an application that uses APIs to exercise selected 5GMSd functions to play back media content. A third party uplink streamer may refer to a part of an application that uses APIs to exercise selected 5GMSu functions to capture and stream media content.

The 5G media streaming architecture defined in 3GPP TS26.501 (3rd Generation Partnership Project; Technical Specification Group Services and System Aspects; 5G Media Streaming (5GMS); General description and architecture (Release 16), V16.3.1) only defines a general architecture for uplink and downlink media streaming. Further, 3GPP TS26.512 defines the concept of uplink streaming where the content is streamed from the device to an external Service Provider.

Figure 3:
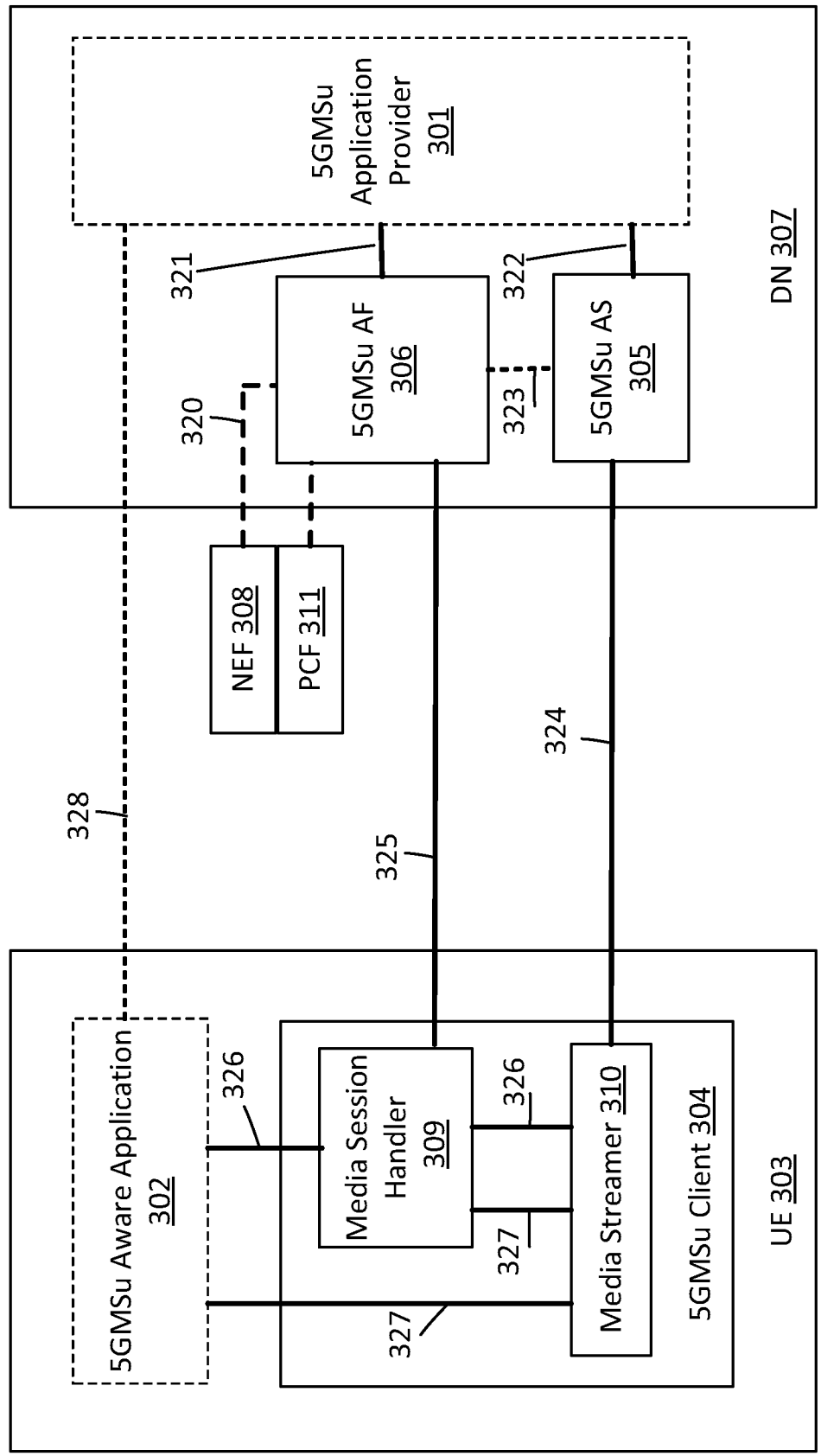
FIG. 3 is a block diagram of a media architecture for media uplink streaming, according to embodiments.

A 5G media-streaming architecture for uplink streaming is shown in FIG. 3.

FIG. 3 is a diagram of a media architecture 300 for media uplink streaming. A 5G media streaming uplink (5GMSu) Application Provider 301 may use 5GMSu for uplink streaming services. 5GMSu Application provider 301 may provide a 5GMSu Aware Application 302 on the UE 303 to make use of 5GMSu Client 304 and network functions using interfaces and APIs defined in 5GMSu. 5GMSu Application Server (AS) may be an AS dedicated to 5G Media Uplink Streaming. 5GMSu Client 304 may be a UE 303 internal function dedicated to 5G Media Uplink Streaming.

5GMSu Application Function (AF) 306 and 5GMSu AS 305 may be Data Network (DN) 307 functions. Functions in trusted DNs may be trusted by the operator's network. Therefore, AFs in trusted DNs may directly communicate with all 5G Core functions. Functions in external DNs may only communicate with 5G Core functions via the Network Exposure Function (NEF) 308 using link 320. In embodiments, link 320 may relate to N33, which may be an API.

The media architecture 300 may connect UE 303 internal functions and related network functions for 5G Media Uplink Streaming. Accordingly, media architecture 300 may include a number of functions. For example, 5GMSu Client 304 on UE 303 may be an originator of 5GMSu service that may be accessed through interfaces/APIs. 5GMSu Client 304 may include two sub-functions, media session handler 309 and media streamer 310. Media session handler 309 may communicate with the 5GMSu AF 306 in order to establish, control and support the delivery of a media session. The Media Session Handler 309 may expose APIs that can be used by the 5GMSu Aware Application 302. Media Streamer 310 may communicate with 5GMSu AS 305 in order to stream the media content and provide a service to the 5GMSu Aware Application 302 for media capturing and streaming, and the Media Session Handler 309 for media session control. 5GMSu Aware Application 302 may control 5GMSu Client 304 by implementing external application or content service provider specific logic and enabling the establishment of a media session. 5GMSu AS 305 may host 5G media functions. 5GMSu Application Provider 301 may be an external application or content specific media functionality, e.g., media storage, consumption, transcoding and redistribution that uses 5GMSu to stream media from 5GMSu Aware Application 302. 5GMSu AF 306 may provide various control functions to the Media Session Handler 309 on the UE 303 and/or to 5GMSu Application Provider 301. 5GMSu AF 306 may relay or initiate a request for different Policy or Charging Function (PCF) 311 treatment or interact with other network functions.

Media architecture 300 may include a number of different interfaces. For example, link 321 may relate to M1u, which may be a 5GMSu Provisioning API exposed by 5GMSu AF 306 to provision usage of media architecture 300 and to obtain feedback. Link 322 may relate to M2u, which may be a 5GMSu Publish API exposed by 5GMSu AS 305 and used when 5GMSu AS 305 in trusted DN, such as DN 307, is selected to receive content for streaming service. Link 323 may relate to M3u, which may be an internal API used to exchange information for content hosting on 5GMSu AS 305 within a trusted DN such as DN 307. Link 324 may relate to M4u, which may be a Media Uplink Streaming API exposed by 5GMSu AS 305 to Media Streamer 310 to stream media content. Link 325 may relate to M5u, which may be a Media Session Handling API exposed by 5GMSu AF 305 to Media Session Handler for media session handling, control and assistance that also include appropriate security mechanisms e.g. authorization and authentication. Link 326 may relate to M6u, which may be a UE 303 Media Session Handling API exposed by Media Session Handler 309 to 5GMSu Aware Application 302 to make use of 5GMSu functions. Link 327 may relate to M7u, which may be a UE Media Streamer API exposed by Media Streamer 310 to 5GMSu Aware Application 302 and Media Session Handler 309 to make use of Media Streamer 310. Link 328 may relate to M8u, which may be an Application API which is used for information exchange between 5GMSu Aware Application 302 and 5GMSu Application Provider 301, for example to provide service access information to the 5GMSu Aware Application 302.

As discussed above, 3GPP TS26.501 defines a general architecture for uplink and downlink media streaming, and 3GPP TS26.512 defines the concept of uplink streaming where the content is streamed from the device to an external Service Provider. According to embodiments, architectures and call flows for various collaboration scenarios for uplink streaming may be provided.

Figure 4:
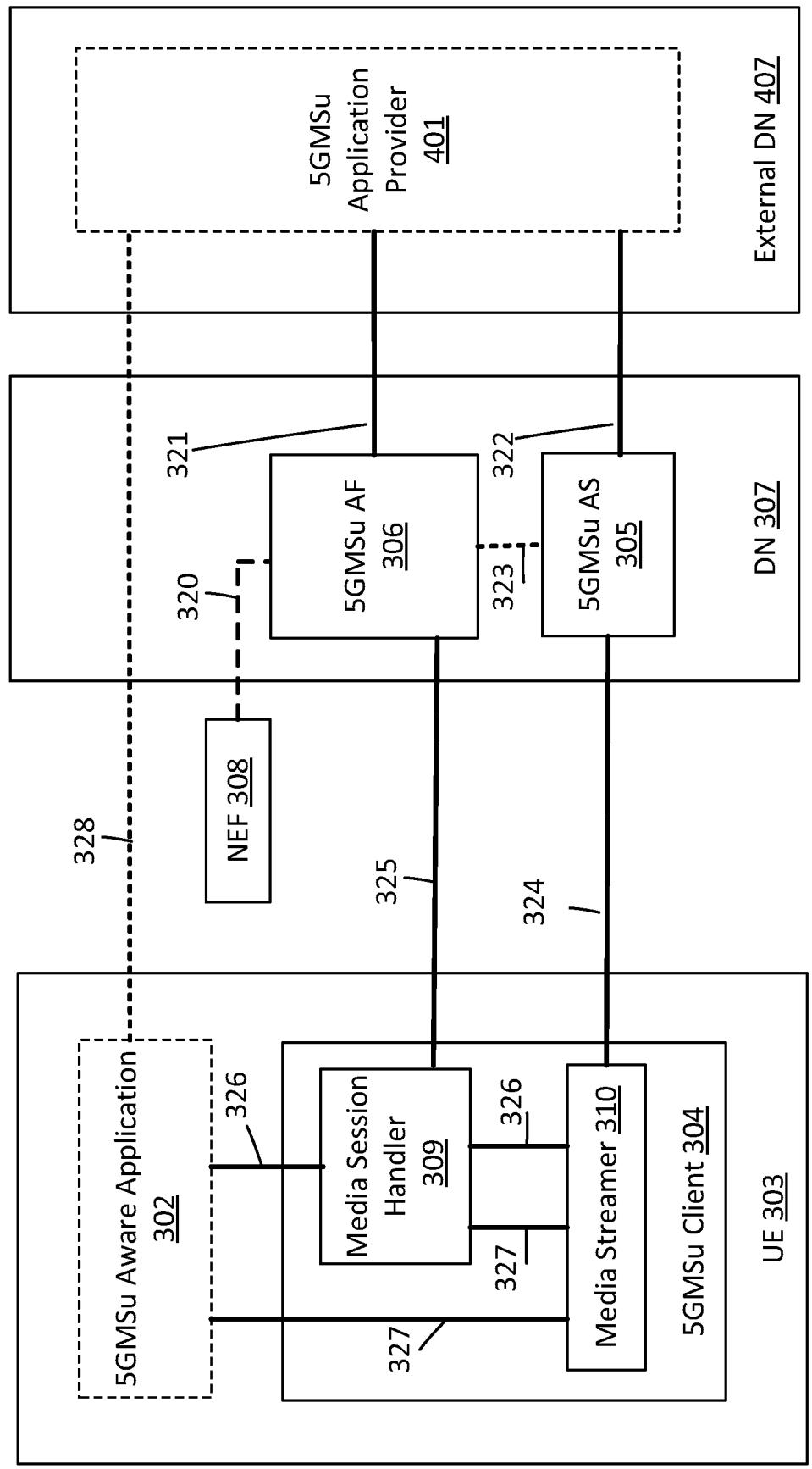
FIG. 4 is a block diagram of a media architecture for media uplink streaming, according to embodiments.

FIG. 4 is a diagram of a media architecture 400 for media uplink streaming, according to embodiments. As can be seen in FIG. 4, media architecture 400 may be similar to media architecture 300, except that 5GMSu Aware Application 302, 5GMSu AF 306, and 5GMSu AS 305 may be in communication with 5GMSu Application Provider 401. In embodiments, 5GMSd Application Provider 401 may be included in external DN 407, rather than trusted DN 307.

In embodiments, media architecture 400 may relate to a collaboration scenario involving a media plane only collaboration for which the 5GMSu AS 305 is deployed in the trusted DN 307. In embodiments, the 5GMS System Provider associated with trusted DN 307 may offer uplink streaming capabilities as a service to 5GMSu Application Provider 401 in the external DN 407.

The components of media architecture 300 and media architecture 400 may be implemented using hardware, firmware, software, or a combination of hardware and software. For example, the components of media architecture 300 and 400 may be implemented as hardware circuitry, one or more microchips, ASICs, one or more processors running computer program code stored on at least one memory (e.g., RAM, ROM or other dynamic or static memory devices), one or more microcontrollers, one or more DSPs, FPGAs, other types of processing components/circuitry, or any combination of the above.

As stated above, while 3GPP TS26.501 and 3GPP TS26.512 define the general uplink process, they not define metrics for upload streaming. Similarly, the DASH-IF Ingest protocol also does not define any metric for uplink streaming. While metrics may be used for downlink streaming of the media content, there are no standards that have definitions for metrics for uplink streaming sessions.

Therefore, definitions of uplink metrics, i.e. specific parameters that may be measured and monitored by the uplink streaming client may be needed and may be provided to a service provider to either dynamically improve the delivery network or for further analysis of the overall delivery system. Embodiments of the present disclosure are directed to defining a set of metrics for uplink streaming, particularly for push/pull-based protocols.

According to an aspect of the present disclosure, an average throughput object may be used to measure and monitor an uplink stream. Since in many uplink streams, the media is uploaded using push/pull protocols, an average throughput object may include the number of bytes that are pushed/pulled for a given predetermined time interval. An inactivity flag may also be included in the average throughput object to indicate whether the uplink stream has become inactive. Table 1 discloses further details associated with the average throughput object.

TABLE 1

Average Throughput Object

| KEY | TYPE | DESRCIPTION |
|---|---|---|
| AvgThroughput | Object | Average throughput that is observed by the client during the measurement interval |
| numbytes | Integer | The total number of the content bytes, i.e. the total number of bytes sent/received during the measurement interval. |
| activitytime | Integer | The activity time during the measurement interval in milliseconds. The activity time during the measurement interval is the time during which at least one push or pull request is still not completed |
| t | Real Time | The wall clock time of the start of the measurement interval |
| duration | Integer | The duration in milliseconds of the measurement interval |
| accessbearer | String | Access bearer for the connection for which the average throughput is reported |
| inactivitytype | Enum | Type of the inactivity, if known and consistent throughout the reporting period: User request (e.g. pause) Error case |

According to an aspect of the disclosure, an activity list may be used as a metric. The activity list may report the activity periods during the uplink session. In an uplink period during uplink monitoring, samples and/or packets of media content and other information may be continuously encoded and uploaded. The activity list may be a the list of these uplink periods, in each of which a continuous delivery is started by a user action and continues until the delivery is paused either due to a temporary paused by the user or a failure. In some embodiments, an uplink period may begin at a specified time. Table 2 discloses further details of the activity list. In some embodiments, the activity list may be referred to as activity list report.

TABLE 2

Activity List Report

| KEY | TYPE | DESCRIPTION |
|---|---|---|
| ActivityList | List | A list of uplink periods during each, the content is uplink streamed. An uplink period is the time interval between a user start and whichever occurs soonest of the user's pause, the end of the session, or a failure that stops uplink streaming. |
| Entry | Object | A record of a single uplink period. |
| start | Real Time | Timestamp of the user action starts the uplink period. |
| starttype | Enum | Type of user action which triggered uplink period. New uplink request Resume from a pause Other user requests (e.g. user-requested quality change) Start of a new metrics collection period |
| Trace | List | List of uplink periods |
| Traceentry | Objects | Single entry in the list. |
| qualitymetricid | String | The identifier of the quality metric id that is used |
| qualityvalue | Integer | The target average quality of content during this period |
| bandwidth | Integer | The target average bitrate of the content during this period |
| start | Real Time | The time at which the first sample was captured |
| duration | Integer | The time in milliseconds of the duration of the continuously uplinked samples. "Continuously presented" means that the media clock continued to advance at the encoded sample rate throughout the interval. |
| stopreason | Enum | The reason why the uploading period was ended. Either: protocol timeout user request end of content end of a metrics collection period encoding error unknown failures other |
| stopreasonscheme | String | The URI identifier scheme to signal the reason of stop when stopreason is set to 'other'. The scheme defines its values and their meaning. This value shall be present only if stopreason='other' |
| Stopreasonvalue | | The reason for the stop, using the stopreasonscheme. This value shall be present only if stopreasonscheme is present. |

According to an aspect of the present disclosure, a media information metric may be used to measure and monitor uplink streaming. The media information metric may be used to report information about media and media quality, including but not limited to, media type, encoding format, codec profile and level, width and height, and other info as shown in the table 3.

TABLE 3

Media Information for Quality Reporting

| KEY | TYPE | DESCRIPTION |
| --- | --- | --- |
| MediaInformation | Object | |
| contenttype | String | Defines the media content type |
| info | RepresentationType | Provides the information for content such as average and max bandwidth, width and height, mimeType, codecs parameters (profiles and level). |

According to an aspect of the present disclosure, a device information metric may be used to measure and monitor the video resolution/image resolution at the user equipment. The metric may be logged at the start of each uplink period, and whenever the characteristics change during the session (for instance if the device is rotated from the horizontal to the vertical orientation, or if the capturing resolution is changed due to the change of capturing camera). Table 4 includes further details of the device information metrics. If an individual metric cannot be logged, its value shall be set to 0 (zero).

TABLE 4

Device Information

| KEY | TYPE | DESCRIPTION |
| --- | --- | --- |
| DeviceInformationList | List | A list of device information objects. |
| Entry | Object | A single object containing new device information. |
| start | Real-Time | Timestamp when the device information was logged. |
| videoWidth | Integer | The width of the displayed video, in screen pixels (not encoded video pixels). |
| videoHeight | Integer | The height of the displayed video, in screen pixels (not encoded video pixels) |
| fieldOfView | Float | The actual or estimated horizontal angle subtended at the eye by the screen, measured in degrees. |

According to an embodiment of the present disclosure, the characteristics of a single uplink stream may be captured, measured, and monitored. The media content uploaded through the single uplink stream and its properties may be monitored and measured. When measuring and monitoring downlink streaming, dynamic switching between various streams may occur, which may reduce the accuracy of the metrics. However, since uplink streaming often comprises a single stream of media content, efficiency and accuracy of metrics measured and monitored may be improved by monitoring the characteristics of a single stream during the uplink streaming.

Figure 5:
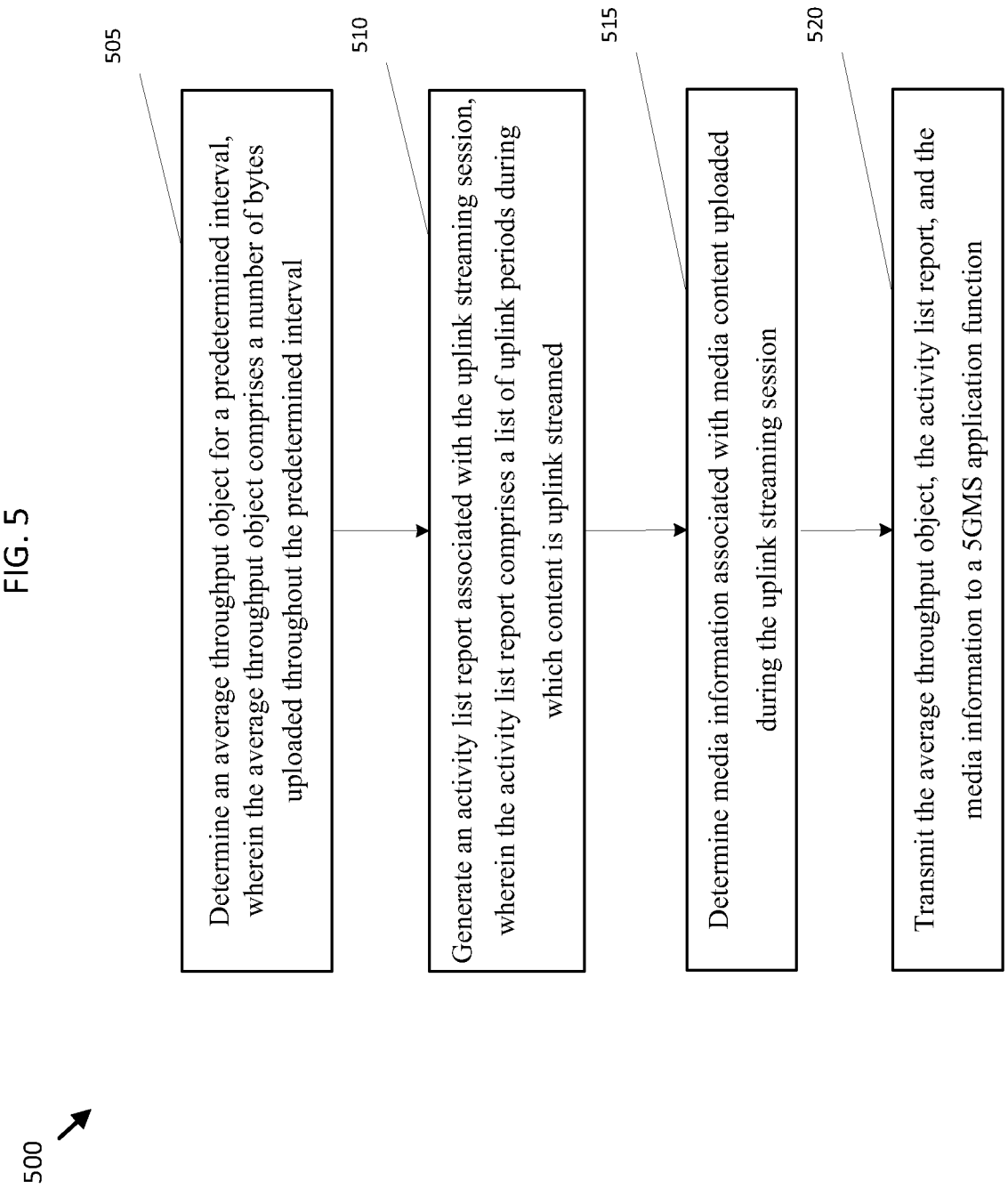
FIG. 5 is a flowchart of an example process of monitoring user equipment during 5G media uplink streaming, according to embodiments.

In contrast to the dynamic switching between various streaming during the downlink streaming, uplink streaming tends to be consisted of a single stream. Therefore, this disclosure only proposes to capture the characteristics of a single stream during the uplink streaming FIG. 5 is a flowchart of example process 500 for monitoring user equipment during 5GMS uplink streaming corresponding to media architecture 300 and media architecture 400, according to embodiments.

At operation 505, an average throughput object for a predetermined interval may be determined. As an example, one of the user equipment 303, the 5GMSu aware application 302, or the 5GMSu client 304 may determine an average throughput object for a predetermined interval. In some embodiments, the average throughput object may include a number of bytes uploaded throughout the predetermined interval. The predetermined interval may be measured in seconds or milliseconds and may be determined by the service provider. In some embodiments, the average throughput object may further include an average number of content bytes uploaded throughout the predetermined interval. In some embodiments, the average throughput object may further include an access bearer indicating a connection for which the average throughput object is reported. In some embodiments, the average throughput object may further include an activity time within the predetermined interval during which at least one push request is incomplete and an inactivity type indicating a type of inactivity within the predetermined interval.

At operation 510, an activity list report associated with the uplink streaming session may be generated. As an example, one of the user equipment 303, the 5GMSu aware application 302, or the 5GMSu client 304 may generate an activity list report associated with the uplink streaming session. In some embodiments, the activity list report may include a list of uplink periods during which content is uplink streamed. In some embodiments, each uplink period in the list of uplink periods may start based on a user action associated with uploading media content. In some embodiments, each uplink period in the list of uplink periods may end when the uploading of the media content is paused or when the uploading of the media content fails. In some embodiments, the activity list report may include one or more activity list objects, and each of the one or more activity list objects may be associated with an uplink period in the list of uplink periods.

In some embodiments, each of the one or more activity list objects may include a start type attribute indicating a type of user action that starts the respective associated uplink period. In some embodiments, each of the one or more activity list objects may include a stop reason attribute indicating a reason for the end of the respective associated uplink period. In some embodiments, each of the one or more activity list objects may include an identifier of a quality metric being used, a target average quality of the media content, and a target average bitrate of the media content.

At operation 515, media information object associated with media content uploaded during the uplink streaming session may be determined. As an example, one of the user equipment 303, the 5GMSu aware application 302, or the 5GMSu client 304 may determine media information object associated with media content uploaded during the uplink streaming session. In some embodiments, the media information associated with the media content may include a media content type and a representation type object. The representation type object may include media content information including but not limited to average and max bandwidth, width and height, mimeType, codecs parameters (profiles and level).

In some embodiments, the process 500 may also include determining device information metrics. Device information metrics may include a timestamp, a width of a displayed video in screen pixels, a height of the displayed video in screen pixels, and a horizontal angle subtended at a user's eye by the user equipment screen.

At operation 520, the average throughput object, the activity list report, and the media information object may be transmitted to a 5GMS application function or a 5GMS Application provider. As an example, the 5GMSu client 304 may transmit the average throughput object, the activity list report, and the media information object to the 5GMSu AF 306. In some embodiments, the 5GMSu aware application 302 may transmit the average throughput object, the activity list report, and the media information object to the 5GMSu Application Provider 301. In some embodiments, the average throughput object, the activity list report, the media information object, and device information metrics may be transmitted to a 5GMS application function or a 5GMS Application provider.

In some embodiments, the user equipment monitoring during the 5GMS uplink streaming session may be monitored across a single stream.

Further, the proposed methods may be implemented by processing circuitry (e.g., one or more processors or one or more integrated circuits). In one example, the one or more processors execute a program that is stored in a non-transitory computer-readable medium to perform one or more of the proposed methods.

The techniques described above can be implemented as computer software using computer-readable instructions and physically stored in one or more computer-readable media.

Embodiments of the present disclosure may be used separately or combined in any order. Further, each of the embodiments (and methods thereof) may be implemented by processing circuitry (e.g., one or more processors or one or more integrated circuits). In one example, the one or more processors execute a program that is stored in a non-transitory computer-readable medium.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, or a combination of hardware and software.

Even though combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A method for user equipment monitoring during a 5G Media Streaming (5GMS) uplink streaming session, the method being performed by at least one processor, the method comprising:
    determining an average throughput object for a predetermined interval, wherein the average throughput object comprises a number of bytes of media content uploaded throughout the predetermined interval;
    generating an activity list report associated with the 5GMS uplink streaming session, wherein the activity list report comprises a list of uplink periods during which content is uplink streamed;
    determining media information object associated with the media content uploaded during the 5GMS uplink streaming session; and
    transmitting the average throughput object, the activity list report, and the media information object to a 5GMS application function.

2. The method of claim 1, wherein the user equipment monitoring the 5GMS uplink streaming session is monitored across a single stream.

3. The method of claim 1, wherein the average throughput object further comprises an average number of content bytes uploaded throughout the predetermined interval.

4. The method of claim 1, wherein the average throughput object further comprises an access bearer indicating a connection for which the average throughput object is reported.

5. The method of claim 1, wherein the average throughput object further comprises an activity time within the predetermined interval during which at least one push request is incomplete and an inactivity type indicating a type of inactivity within the predetermined interval.

6. The method of claim 1, wherein each uplink period in the list of uplink periods starts based on a user action associated with uploading the media content, and wherein each uplink period in the list of uplink periods ends when the uploading of the media content is paused or when the uploading of the media content fails.

7. The method of claim 6, wherein the activity list report comprises one or more activity list objects, and wherein each of the one or more activity list objects is associated with an uplink period in the list of uplink periods.

8. The method of claim 7, wherein each of the one or more activity list objects comprises a start type attribute indicating a type of user action that starts the respective associated uplink period and a stop reason attribute indicating a reason for the end of the respective associated uplink period.

9. The method of claim 7, wherein each of the one or more activity list objects comprises an identifier of a quality metric being used, a target average quality of the media content, and a target average bitrate of the media content.

10. The method of claim 1, wherein the media information object associated with the media content comprises a media content type and a representation type object.

11. The method of claim 1, wherein the method further comprises:
    determining device information metrics, wherein the device information metrics comprise a timestamp, a width of a displayed video in screen pixels, a height of the displayed video in screen pixels, and a horizontal angle subtended at a user's eye by the user equipment screen; and
    transmitting the device information metrics to the 5GMS application function.

12. A device for user equipment monitoring during a 5G Media Streaming (5GMS) uplink streaming session, the device comprising:
at least one memory configured to store program code; and
at least one processor configured to read the program code and operate as instructed by the program code, the program code including:
first determining code configured to cause the at least one processor to determine an average throughput object for a predetermined interval, wherein the average throughput object comprises a number of bytes of media content uploaded throughout the predetermined interval;
first generating code configured to cause the at least one processor to generate an activity list report associated with the 5GMS uplink streaming session, wherein the activity list report comprises a list of uplink periods during which content is uplink streamed;
second determining code configured to cause the at least one processor to determine media information object associated with the media content uploaded during the 5GMS uplink streaming session; and
first transmitting configured to cause the at least one processor to transmit the average throughput object, the activity list report, and the media information object to a 5GMS application function.

13. The device of claim 12, wherein the average throughput object further comprises an average number of content bytes uploaded throughout the predetermined interval.

14. The device of claim 12, wherein the average throughput object further comprises an access bearer indicating a connection for which the average throughput object is reported.

15. The device of claim 12, wherein the average throughput object further comprises an activity time within the predetermined interval during which at least one push request is incomplete and an inactivity type indicating a type of inactivity within the predetermined interval.

16. The device of claim 12, wherein each uplink period in the list of uplink periods starts based on a user action associated with uploading the media content, and wherein each uplink period in the list of uplink periods ends when the uploading of the media content is paused or when the uploading of the media content fails.

17. The device of claim 16, wherein the activity list report comprises one or more activity list objects, and wherein each of the one or more activity list objects is associated with an uplink period in the list of uplink periods.

18. The device of claim 17, wherein each of the one or more activity list objects comprises a start type attribute indicating a type of user action that starts the respective associated uplink period and a stop reason attribute indicating a reason for the end of the respective associated uplink period.

19. The device of claim 12, wherein the program code further comprises:
third determining code configured to cause the at least one processor to determine device information metrics, wherein the device information metrics comprise a timestamp, a width of a displayed video in screen pixels, a height of the displayed video in screen pixels, and a horizontal angle subtended at a user's eye by the user equipment screen; and
second transmitting code configured to cause the at least one processor to transmit the device information metrics to the 5GMS application function.

20. A non-transitory computer-readable medium storing instructions, the instructions comprising: one or more instructions that, when executed by one or more processors of a device for 5G media streaming (5GMS) uplink streaming session, cause the one or more processors to:
determine an average throughput object for a predetermined interval, wherein the average throughput object comprises a number of bytes of media content uploaded throughout the predetermined interval;
generate an activity list report associated with the 5GMS uplink streaming session, wherein the activity list report comprises a list of uplink periods during which content is uplink streamed;
determine media information object associated with the media content uploaded during the 5GMS uplink streaming session; and
transmit the average throughput object, the activity list report, and the media information object to a 5GMS application function.

* * * * *